US012078061B2

(12) United States Patent
Delgoshaie et al.

(10) Patent No.: US 12,078,061 B2
(45) Date of Patent: Sep. 3, 2024

(54) WATERFLOOD MANAGEMENT OF PRODUCTION WELLS

(71) Applicant: C3.ai, Inc., Redwood City, CA (US)

(72) Inventors: Amir Hossein Delgoshaie, Palo Alto, CA (US); Mehdi Maasoumy Haghighi, Redwood City, CA (US); Riyad Sabir Muradov, Redwood City, CA (US); Sina Khoshfetratpakazad, Redwood City, CA (US); Henrik Ohlsson, Menlo Park, CA (US); Philippe Ivan S. Wellens, Moraga, CA (US)

(73) Assignee: C3.ai, Inc., Redwood City, CA (US)

( * ) Notice: Subject to any disclaimer, the term of this patent is extended or adjusted under 35 U.S.C. 154(b) by 0 days.

(21) Appl. No.: 17/381,420

(22) Filed: Jul. 21, 2021

(65) Prior Publication Data
US 2022/0025765 A1    Jan. 27, 2022

Related U.S. Application Data

(60) Provisional application No. 63/054,991, filed on Jul. 22, 2020.

(51) Int. Cl.
| | | |
|---|---|---|
| *E21B 49/00* | (2006.01) | |
| *E21B 43/20* | (2006.01) | |
| *G06V 10/84* | (2022.01) | |

(52) U.S. Cl.
CPC ............ *E21B 49/008* (2013.01); *E21B 43/20* (2013.01); *E21B 2200/20* (2020.05);
(Continued)

(58) Field of Classification Search
CPC .. E21B 2200/20; E21B 2200/22; E21B 41/00; E21B 43/20; E21B 49/008; G01V 2210/663; G06V 10/84
See application file for complete search history.

(56) References Cited

U.S. PATENT DOCUMENTS

| | | |
|---|---|---|
| 6,799,117 B1 | 9/2004 | Proett et al. |
| 2007/0118346 A1 | 5/2007 | Wen et al. |

(Continued)

FOREIGN PATENT DOCUMENTS

| | | |
|---|---|---|
| WO | 2019118658 A1 | 6/2019 |

OTHER PUBLICATIONS

Christie, Mike, Vasily Demyanov, and Demet Erbas. "Uncertainty quantification for porous media flows." Journal of Computational Physics 217.1 (2006): 143-158.*

(Continued)

*Primary Examiner* — Rehana Perveen
*Assistant Examiner* — Nithya J. Moll

(57) ABSTRACT

A method of waterflood management for reservoir(s) having production hydrocarbon-containing well(s) including injector well(s). A reservoir model has model parameters in a mathematical relationship relating a water injection rate to a total production rate of the production well including at least one of a hydrocarbon production rate and water production rate. A solver implements automatic differentiation utilizing training data regarding the reservoir including operational data that includes recent sensor and/or historical data for the water injection rate and the hydrocarbon production rate, and constraints for the model parameters. The solver solves the reservoir model to identify values or value distributions for the model parameters to provide a trained reservoir model. The trained reservoir model uses water injection schedule(s) for the injector well to generate predictions for the total production rate.

35 Claims, 5 Drawing Sheets

(52) U.S. Cl.
CPC .... *E21B 2200/22* (2020.05); *G01V 2210/663* (2013.01); *G06V 10/84* (2022.01)

(56) References Cited

U.S. PATENT DOCUMENTS

| | | | |
|---|---|---|---|
| 2013/0245952 A1 | 9/2013 | Lin et al. | |
| 2019/0292884 A1 | 9/2019 | McClure | |
| 2019/0301269 A1 | 10/2019 | Liu et al. | |
| 2021/0027144 A1* | 1/2021 | Madasu | G01V 99/005 |

OTHER PUBLICATIONS

Hanea, Anca, Oswaldo Morales Napoles, and Dan Ababei. "Nonparametric Bayesian networks: Improving theory and reviewing applications." Reliability Engineering & System Safety 144 (2015): 265-284.*

Jin, Zhaoyang Larry, Yimin Liu, and Louis J. Durlofsky. "Deep-learning-based surrogate model for reservoir simulation with time-varying well controls." Journal of Petroleum Science and Engineering 192 (2020): 107273.*

Kucukelbir, Alp, et al. "Automatic differentiation variational inference." Journal of machine learning research (2017).*

Thiele, Marco R., and Rod P. Batycky. "Using streamline-derived injection efficiencies for improved waterflood management." SPE Reservoir Evaluation & Engineering 9.02 (2006): 187-196.rence. Journal of machine learning research (2017).*

Mohaghegh, Shahab D., et al. "Data-driven reservoir management of a giant mature oilfield in the Middle East." SPE annual technical conference and exhibition. OnePetro, 2014.*

Zhang, Qitao, et al. "Potential for prediction of water saturation distribution in reservoirs utilizing machine learning methods." Energies 12.19 (2019): 3597.*

Yue, Zhao, Zhao Songzheng, and Liu Tianshi. "Bayesian regularization BP Neural Network model for predicting oil-gas drilling cost." 2011 International Conference on Business Management and Electronic Information. vol. 2. IEEE, 2011.*

De la Varga, Miguel, Alexander Schaaf, and Florian Wellmann. "GemPy 1.0: open-source stochastic geological <? xmltex\break?> modeling and inversion." Geoscientific Model Development 12.1 (2019): 1-32.*

Krapu, Christopher, Mark Borsuk, and Mukesh Kumar. "Gradient-based inverse estimation for a rainfall-runoff model." Water Resources Research 55.8 (2019): 6625-6639.*

Dehdari, Vahid, Dean S. Oliver, and Clayton V. Deutsch. "Comparison of optimization algorithms for reservoir management with constraints—a case study." Journal of Petroleum Science and Engineering 100 (2012): 41-49.*

Kleppe, Jon, and Richard A. Morse. "Oil production from fractured reservoirs by water displacement." SPE Annual Technical Conference and Exhibition?. SPE, 1974.*

Extended European Search Report dated Jul. 9, 2024 in connection with European Patent Application No. 21846708.2, 12 pages.

Artun, "Characterizing interwell connectivity in waterflooded reservoirs using data-driven and reduced-physics models: a comparative study," Neural Computing Applications, vol. 28, No. 7, Jan. 2016, 15 pages.

Navratil et al., "Accelerating Physics-Based Simulations Using Neural Network Proxies: An Application in Oil Reservoir Modeling," May 2019, 9 pages.

Negash et al., "Artificial neural network based production forecasting for a hydrocarbon reservoir under water injection," Petroleum Exploration and Development, vol. 47, Issue 2, Apr. 2020, 10 pages.

Mallick, "Bayesian inference in Inverse problems," Jul. 2011, 45 pages.

* cited by examiner

WATERFLOOD MANAGEMENT OF PRODUCTION WELLS

CROSS REFERENCE TO RELATED APPLICATIONS

This application claims the benefit of Provisional Application Ser. No. 63/054,991 entitled "WATERFLOOD MANAGEMENT OF PRODUCTION WELLS", filed on Jul. 22, 2020, which is herein incorporated by reference in its entirety.

FIELD

Disclosed aspects relate to waterflood management for hydrocarbon production, including for oil and natural gas production.

BACKGROUND

Extraction of hydrocarbon fuels (including oil and natural gas) through production wells from underground reservoirs is often accompanied by injection of water or brine, which is generally referred to as produced water. As the reservoir is utilized for production for a long period of time (generally depending on the size of the reservoir), commonly known as maturing, there is a decline in the natural pressure on the reservoir, which reduces its hydrocarbon production rate. To address this decline in natural pressure (and corresponding reduced hydrocarbon output), waterflooding is commonly used. Waterflooding is where a plurality of wells known as injection wells are drilled into the reservoir, and water from the injection wells is injected under pressure into the reservoir. The injection of water into the reservoir adds pressure which helps push the hydrocarbons out of the reservoir, which is generally referred to as secondary recovery methods.

During waterflooding, significant volumes of water may be injected into the reservoir, so that a mixture of oil and/or natural gas and a significant amount of water will be extracted. While using waterflooding, the quantity of water extracted can exceed the volume of the hydrocarbons extracted before the reservoir's hydrocarbon supply is exhausted. The cost of producing, handling, and disposing of the produced water often defines the economic lifetime of a reservoir and the actual hydrocarbon reserves.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize that conventional waterflooding processes can be costly as it requires sourcing and handling of water that is injected into a production well(s) to extract hydrocarbon deposits, followed by separating the water extracted with the hydrocarbons using a separator. Water injection scheduling provides a timing (when) and a selection of at least one injection well (where to inject water into the reservoir), and optionally also the quantity of water injected into a production well. Conventional water injection scheduling can lead to unwanted financial, environment or other consequences. Disclosed aspects solve this problem by providing machine learning (ML) data-driven models (referred to herein as reservoir models) that provide predictions for a total production rate of the production well comprising at least one or both of the hydrocarbon production rate and the water production rate meaning there can be both of these rates provided separately, or only one of these rates may be provided.

One disclosed aspect comprises a method of waterflood management for a reservoir having at least one production hydrocarbon-containing well (production well) including at least one coupled injector well. Injection wells are not physically coupled to any production well, but are instead coupled to the production well by injecting water subsurface, and are generally positioned in a way to support pressure in one or more production wells. Injector wells are also coupled mathematically into a disclosed mathematical model. The mathematical model for the reservoir (reservoir model) is provided, such as the known capacitance resistance model (CRM), relating at least a water injection rate of the injector well (optionally also a bottom hole pressure of the production well) to a total production rate of the production well including at least one of the hydrocarbon production rate and the water production rate. The mathematical model can comprise a linear or non-linear equation.

A CRM is only one example of a disclosed reservoir model. Reservoir models other than CRM can be used using disclosed aspects to numerically model the operation of the reservoir. At minimum, the reservoir model comprises model parameters and accepts injection schedules of injection wells and maps the inputs to a total production rate comprising at least one of the hydrocarbon production rate and the water production rate. Optionally the reservoir model can accept other inputs such as bottom hole pressure of producer wells and other information about the reservoir such as the location of the wells and other physical properties of the reservoir such as the compressibility and the permeability. Besides the CRM, another example of a disclosed reservoir model is a data-driven surrogate reservoir model (SRM).

A solver is run that implements automatic differentiation utilizing training data regarding the reservoir, including operational data comprising at least one of recent sensor data and historical data for the water injection rate and the hydrocarbon production rate, and constraints for the model parameters. The solver solves the reservoir model to identify values or distributions of values for the model parameters to provide a ML-based trained reservoir model. The solver can comprise a variety of different solver types, including a Bayesian inference solver. The trained reservoir model is run using at least one water injection schedule provided for the injector well(s), where the trained reservoir model generates outputs include predictions for the total production rates.

DETAILED DESCRIPTION

Figure 1:
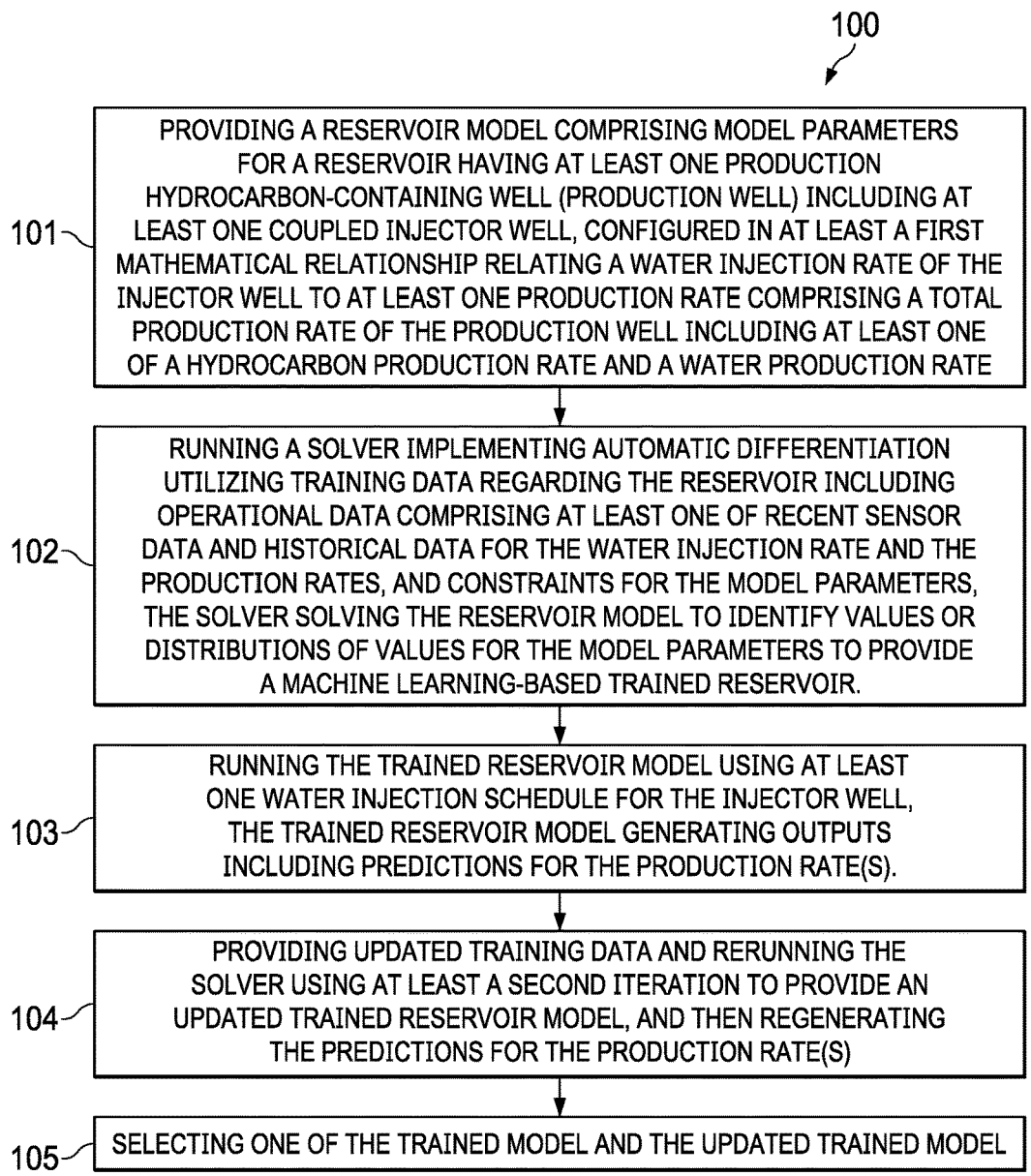
FIG. 1 is a flow chart that shows steps in an example method of waterflood management of a reservoir including at least one production well including at least one coupled injector well, that includes a solver implementing automatic differentiation for finding the parameters for a reservoir model for the reservoir resulting in a trained reservoir model that can provide predictions for a total production rate including at least one of the hydrocarbon production rate and the water production rate, according to an example aspect.

Disclosed aspects are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed aspects.

The reservoir model as described above for disclosed aspects is configured in a mathematical relationship relating a water injection rate of the injector well(s) and optionally a bottom hole pressure of the production well(s) to a total production rate of the production well(s) including at least one of a hydrocarbon production rate and a water production rate. This mathematical relationship for the reservoir model can be a linear equation or a non-linear equation. In its most basic form, a reservoir model describes a material balance for a reservoir having hydrocarbon reserves with one water injector and one producer well. An example reservoir model comprises a CRM, where the CRM equation is copied below.

$$ctVp \cdot dp/dt = i(t) - q(t)$$

Where ct is the total compressibility, Vp is the drainage pore volume, p is the average pressure in Vp, i(t) is the water injection rate, and q(t) is the production rate including the hydrocarbon production rate and the water production rate. This CRM equation is a valid relation under a simplifying assumption that the total compressibility of the reservoir is small, which is generally met by most reservoirs other than a small fraction of reservoirs which are relatively small reservoirs, where the total compressibility may not be necessarily small.

Provided below is a glossary of some terms used herein:

Facility: can be a network or a plant where an industrial process takes place.

Surface network: comprises the pipelines that connect the production wells in the field to the collection header to the terminal.

Automatic differentiation: a set of techniques that algorithmically evaluate (solve) the derivative(s) of a function (e.g., a non-linear partial differential equation), the solver specified by code of a computer program.

Processing facilities: perform 'basic' separation and treatment of the fluid produced (separation of oil, water, light gas, condensate, liquefied petroleum gas (LPG) . . . ) before it gets exported.

System: A collection of subsystems performing a chemical reaction or physical operation that occurs on the material in the manufacturing process. Examples:

Field: number of connected production wells from the same reservoir.

Collection header: a pipe arrangement that connects flowlines from several wellheads into a single gathering line.

Well: a single boring in the earth that is designed to bring hydrocarbons (e.g., crude oil, or natural gas) to the surface, or to inject a liquid, typically water.

Water injection scheduling: when (the time) and how much (the volume) of water to inject into each injection well to increase hydrocarbon production rate from one or more production wells.

Pipeline: a tube or system of tubes used for transporting crude oil and natural gas from the field to the refinery.

Subsystem: A collection of equipment or a collection of smaller subsystems performing a chemical reaction or physical operation that occurs on the material in the process. Relationships between subsystems may be both linear and hierarchical.

Separator: A vessel used to separate oil, gas and water from the total fluid stream produced by a well. Separators can be classified into two-phase and three-phase separators. The two-phase type deals only with oil and gas, while the three-phase type handles oil, water and gas.

Asset: a single piece of equipment (e.g., valve, tube). It is noted that oil & gas operators may also use the term 'asset' to refer to a revenue-generating system of systems (e.g., offshore oil platform, gas reservoir). This application will generally only use the term asset to refer to individual pieces of equipment. Examples include:

Flowmeter: an instrument that measures the flow rate of fluids through a pipeline.

Virtual meter or virtual metering: uses models to estimate flow rates and/or temperature and pressure instead of using a physical meter.

Tag: individual data series associated with a measurement point on an asset (e.g., pressure, temperature, flow rate). Tag is the name of the time series. Each tag will generally have data points for different time stamps.

FIG. 1 is a flow chart that shows steps in an example method 100 of waterflood management for a reservoir having at least one production hydrocarbon-containing well (production well) including at least one coupled injector well. Step 101 comprises providing a reservoir model comprising model parameters for the reservoir configured in a mathematical relationship relating a water injection rate of the injector well to at least one production rate comprising a total production rate of the production well including at least one of the hydrocarbon production rate and a water production rate being provided separately, or only one of the hydrocarbon production rate and the water production rate may be provided. The mathematical relationship can be a linear or non-linear equation. The reservoir model parameters can also optionally include a bottom hole pressure of the production well.

The reservoir model is a data driven method for characterizing a reservoir and optimizing its oil production without complex and time-consuming reservoir simulations or need for geological modeling. The reservoir model only generally needs historical production rate data that is collected in most waterfloods. Generally the more data the better the reservoir model result. The data used are water production rates by well, oil production rates by well, water injection rates by well, and well coordinates for both injection and production wells. If available, bottom hole pressures for the producing wells and/or the coordinates of the well(s) can also be used. Test results may also be used as input data, such as tracer data and other well tests, that can involve shutting the well down and seeing how the pressure builds up.

Step 102 comprises running a solver implementing automatic differentiation utilizing training data regarding the reservoir including operational data comprising at least one of recent sensor data and historical data for the water injection rate and the hydrocarbon production rate, and constraints for the model parameters. The solver solves the reservoir model to identify values for the model parameters to provide a ML-based trained reservoir model. 'Recent' as used herein can mean real-time data, essentially real-time data, or near real-time data. Essentially real-time updated as used herein means data updated every 15 minutes to every one hour if such real-time data is available, and near real-time data as used herein is updated less frequently as compared to essentially real-time data, but is updated at least about once a month. The recent data can provide new training data to enable updating the reservoir model. 'Historical' data as used herein means data that is over one month old.

There may not be a need for both recent sensor data and historical data for the water injection rate and the hydrocarbon production rate. In the disclosed Bayesian approach, a user starts with initial ranges for the water injection rate and the hydrocarbon production rate (the rates being based on an initial belief without any historic data) and updates the belief as new water injection rate and/hydrocarbon production rate data becomes available. In a disclosed approach a user can start with historical data for water injection rate and the hydrocarbon production rate and find model parameters by learning from the historical data. A mixture of these two approaches is also possible where the user can have both prior beliefs and historical data.

Step 103 comprises running the trained reservoir model using at least one water injection schedule for the injector well, where the trained reservoir model generates outputs including predictions for the total production rate. Step 104 comprises providing updated (or new) training data as more recent data becomes available, and rerunning the solver (step 102) for implementing an iterative solver using at least a second iteration to provide an updated trained reservoir model, and then regenerating the predictions for the total production rate using the updated trained reservoir model. During model development, a plurality of reservoir models may be trained and their performance regarding their predictions evaluated to determine the best performing models to deploy in a given customer's application.

Step 105 comprises selecting one of the trained reservoir models from a plurality of the reservoir models that were trained and evaluated; the trained reservoir model selected having a performance predicted to be the best performing trained model for the customer's application. The bottom hole pressure of production well(s) and or the coordinates of the well(s) may also be part of the reservoir model included as data that is generally measured by pressure sensors and controlled by choke valves.

The water injection schedule for running the trained reservoir model is generally specified by the user. The user may have constraints on the injection schedules. In that case the specified schedule should satisfy the operational constraints. When there is a plurality of water injection schedules provided, the trained reservoir model can determine a best water injection schedule from the plurality of water injection schedules, or water injection schedules based on an objective specified by a user. In addition to constraints the user can specify what is the objective function for picking the best reservoir model, or can choose from a number of proposed objectives. This aspect is also explained below.

For picking the best water injection from a plurality of the candidate water injection schedules, one objective and multiple constraints may be considered. The items listed about 12 paragraphs below as a-d are possible objectives and constraints that can be used to find a water injection schedule. For example, the user might be interested to find the water injection schedule that maximizes oil production while satisfying the following constraints: total water produced less than some specified amount, and water injection rate in each well less than some specific amount. In general, a user wants to find the water injection schedule that maximize/minimize the objective while honoring the respective constraints.

Alternatively, the user can specify the constraints on the water injection rates, and an optimization objective, then the disclosed application will specify the best water injection schedule that honors those constraints. Examples constraints for water injection scheduling comprise a maximum injection rate per well, maximum total injection rate, and maximum cumulative water injected in a set period of time.

The solver can comprise a Bayesian inference solver. A Bayesian inference is a method of statistical inference in which Bayes' theorem is used to update the probability for a hypothesis as more evidence or information becomes available so that it is a form of ML. The Bayesian inference solver is used to find the model parameters and uses constraints on the model parameters. For example, regarding the constraints, some model parameters can only be positive values and some model parameter values should be equal to one, or less than or equal to one.

There are specific scalable methods recognized to be available for the Bayesian inference solver to implement an automatic differentiation variational inference or variational neural networks. Variational auto-encoders are a subset of variational neural networks.

A Bayesian inference solver allows a customer to use prior knowledge (other than the basic model parameters) in the model. Below are listed examples of such prior knowledge.

Oil companies generally perform expensive tracer tests, such as by injecting a tracer and tracking which producers will show traces of the injected material. Using the disclosed Bayesian inference solver approach, it is possible to use these test results and other prior knowledge in the model. Prior knowledge can also include geological analysis (which is generally relatively expensive to generate) that can provide information for the reservoir model, such as geological analysis that evidences two production wells cannot be connected together. Also, prior knowledge can include results from high fidelity simulation models. These are results from typically expensive simulation software that can inform disclosed reservoir models.

The Bayesian inference solver converts the problem to be solved into a much more tractable optimization of the reservoir model problem. Instead of solving a constrained reservoir model optimization problem, using the Bayesian inference solver a user can solve an approximate unconstrained problem which is generally significantly simpler to solve.

The Bayesian inference solver also allows solving simultaneously for all the production wells in large oil and gas reservoirs. Generating reservoir model predictions in the case of large oil and gas reservoirs can be prohibitively time consuming using known reservoir models, that have to chunk the reservoir into small sizes, and which has to then worry about modeling the interfaces between these chunks.

The Bayesian inference solver also generally makes it simpler to fuse information from measurements and model predictions. Hence, the Bayesian inference solver better deals with newly drilled wells that do not have a long history of production, but do have some measurements of hydrocarbon and water production rates. From a technical perspective the Bayesian inference solver formulations of the problems allows the use of deep learning (for example variational auto-encoders) to scale this solution to large oil and gas fields, in the case of a sufficient amount of data is available.

Other capabilities provided by the Bayesian inference solver can include performing stochastic optimization on the reservoir model to find control parameters and the associated uncertainty. In the case of a Bayesian inference solver, the method can further comprise adding test data regarding the reservoir, such as tracer tests, as additional training data utilized by the solver. Tracers are known to be used in the oil industry in order to qualitatively or quantitatively gauge how fluid flows through the reservoir and, in addition, are a useful tool for estimating residual oil saturation.

Tracers can be used in either inter-well tests or single well tests. In inter-well tests, the tracer is injected at one well along with water as the carrier fluid for waterflooding and detected at a producing well after some period of time, which can be from several days to years. In single well tests, tracer is injected into the formation from a well and then produced out the same well. Tracers can be radioactive or chemical, gas or liquid and have been conventionally used in the oil industry for several decades.

The trained reservoir model can further select the water injection schedule from a plurality of water injection schedules using injection schedule considerations which include at least one financial constraint and/or at least one physical constraint, the objective for finding optimal control variables, where the bottom hole pressure of producer wells can also be controlled and an optimal schedule may be found for it. In general, the water injection schedule and bottom hole pressure schedule can be considered control variables, and one or both of them can be controlled.

The water injection schedule considerations for selecting a particular (best performing) water injection schedule from a plurality of schedules can be any objective that maps the input injection (and optionally the bottom hole pressures) and output production rates of the reservoir model to a single number. Some example objectives are the following:
 a. a total production value (e.g., in US $) of the reservoir;
 b. a total cost of produced water treatment;
 c. a total cost of water injection;
 d. target hydrocarbon production rates.

The constraints for the control variables can be selected from a list similar to the above list, shown below:
 a. Injection rates should lessen the capacity of the injection equipment.
 b. Total injected water should be less than the available water for injection.
 c. Bottom hole pressures should be in the range that can be tolerated by the well tubing and control equipment.

The iterative solver can also comprise a Quasi-Newton nonlinear (QNN) solver that utilizes an analytic gradient of the reservoir model. Quasi-Newton methods are methods used to either find zeroes or local maxima and minima of functions, as an alternative to Newton's method. The QNN can be used if the Jacobian or Hessian is unavailable or is too expensive to compute at every iteration. The "full" Newton's method requires the Jacobian in order to search for zeros, or the Hessian for finding extrema. The Jacobian of a scalar-valued function is known to be a vector consisting of first-order partial derivatives of the function. The Hessian of a scalar-valued function is known to be a square matrix of second order partial derivatives of the function.

The trained reservoir model can further provide an uncertainty quantification for the predicted hydrocarbon production rate and for the predicted water production rate of the producer well(s), and uncertainty quantification for at least one of the model parameters that have a physical meaning. As an example, for a model parameter that has a physical meaning, time constants for the production wells are known to be a proxy for compressibility of the reservoir. Other examples of model parameters having a physical meaning include pore volume and productivity index.

The method can further comprise providing the outputs to controllers associated with the reservoir to automatically monitor the sensor data and send alerts, such as alerts to field operators or control signals to control devices configured to adjust the operating conditions for the reservoir. Outputs from the trained reservoir model (providing water production rates and hydrocarbon rates such as oil or gas production rates) can be compared with measured outputs in the field provided by sensors (sensor data). In case there is determined to be a large deviation between the sensor data and the model predictions an alarm can be raised. The selected water injection schedule and the calculated bottom hole pressure can be sent to controllers to set the injection rates and bottom hole pressures.

The solver can further implement a loss function that quantifies a difference between the predictions for the hydrocarbon production rate and an actual hydrocarbon production rate and the predictions for the water production rate and an actual water production rate. Conventional loss functions are recognized to have the problem of being sensitive to outliers in the data (e.g., very large production rates recorded for short periods of time) and can generally not handle situations where there is a significant difference between the oil or gas and water production rates, such as in one particular example where water production rate is an order of magnitude larger than oil production rate. This results in conventional loss functions having trouble fitting both the water production rate and oil production rate. By normalizing the mismatch by the observed rates and using an absolute value norm (L1 norm), using disclosed loss functions, outliers and the effects of significant differences between oil or gas and water production rates on the solution may be guarded against.

The at least one injector well can comprise a plurality of the injector wells, and the reservoir model can further model a coupling between each of the plurality of injector wells and the production well. The at least one production well can comprise a plurality of production wells, and the reservoir model can further model a coupling between respective ones of the plurality of production wells and the injection wells.

In the case where the wells are grouped, the solution can describe the sum of production from that group of wells, not each individual well separately. The reservoir model can include the coupling/influence between respective production wells (can be a combination of wells) and injection wells (can also be a combination of injection wells), but generally not the coupling between a plurality of production rates. Regarding injector or well model combinations, the user can also group a number of real water injectors together as one water injector in the reservoir model, and can also group a number of producer wells together as one producer well in the reservoir model. Then when that reservoir model is trained it will describe groups of water injectors/producer wells, not the individual real water injectors/producer wells that they comprise.

The reservoir model can comprise a Bayesian reservoir model that comprises probabilistic graphical modeling. The probabilistic approach is also referred to as probabilistic graphical modeling or probabilistic programming. The outputs can further comprise a derivative of the predictions for the hydrocarbon production rate and a derivative of the prediction for the water production rate with respect to the injection rate for each of the plurality of injector wells. Since the method includes automatic differentiation, these derivatives can be readily calculated.

ML pipeline disclosed methods and artificial intelligence (AI)/ML applications can benefit from five outcomes generated by ML algorithms. These outcomes comprise virtual metering, uncertainty estimation, production back-allocation, well influence and dependency score, and a production forecast. Each of these outcomes is described below.

Regarding the virtual metering, disclosed methods and AI/ML applications enable a user to see a continuous estimation of the state (e.g. water and hydrocarbon flow rates) of wells and of select surface network assets, at locations where state estimation is possible. By utilizing the models in production optimization, a user has access to significantly more estimates compared to relying solely on sensor readings that can be infrequently provided.

Trained reservoir models can be used for virtual metering. In this step of the process, either a data-driven or a hybrid approach may be used to virtually meter desired parts of the surface reservoir network. The approach is selected and configured during the deployment of the disclosed application. The outputs of this step are estimates of "state" variables (e.g. pressure, flow rate) across all in-scope points-of-interest in the network. The most common virtual metering framework used by the disclosed methods and AI/ML applications generally leverages a supervised ML method. Supervised ML virtual metering for modeling, including for reservoir models, has several recognized advantages including being highly scalable. The virtual metering-based reservoir models can be built for many points of interest, leveraging large amounts of data, and involving a minimum of manual work. The feature engineering work and model tuning can be automated across a large number of virtual meters, allowing the model to be improved over time. The ML-based reservoir models can, for example, be tuned over time to account for changes in the dynamics of the reservoir. It is noted that disclosed virtual meters are not necessarily reservoir models because they can generally include other supervised models.

Regarding uncertainty estimation, disclosed methods and AI/ML applications enable uncertainty estimation for in-scope states of the system. This enables production and facility engineers to adjust control variables given the uncertainty of the measurements and the reservoir model estimates. Depending on the type of reservoir models utilized within this approach estimates of the uncertainty for the physical quantities of interest may be found by using the applicable pre-configured uncertainty quantification methods. For a CRM model specifically, uncertainty estimates can be obtained by bootstrapping training data or multiple solutions of the solver starting from different initial conditions, or by using the posterior distribution in case of a Bayesian CRM.

Regarding production back-allocation, an objective of this step is to obtain flow rate estimates across all points of interest in the network so that the total production rate across the individual production wells in the field may be disaggregated. This can be achieved by building ML reservoir models that are trained using data available from periods where rate measurements from individual wells is available. These reservoir models are then used to estimate rates for periods where individual well measurements are not available. Once the reservoir model is trained it can be used to predict current rates, even if the current rates are not individually measured. Using this information, the sum of production from multiple wells can be allocated to individual production wells.

Regarding a well influence and dependency score, it is generally of value to end users to estimate the relations between injection or production wells and other production wells. Using the developed approach based on reservoir models, the application quantitatively studies the effect of the injectors on each production well. Similarly, it uses the outputs of the reservoir model to provide an influence score between a well pair of interest.

As noted above, reservoir models such as CRMs are a class of hybrid solutions with physics-based and data-driven components. Reservoir models can model the production rate of each producer by superimposing analytical solutions to the governing material balance equation that describes the influence of individual injectors on that producer in a simplified domain. Given the historic injection and production rates, one can solve for the optimal parameters that result in the best fit between the predictions and measured values for the total production rate comprising at least one of the hydrocarbon production rate and the water production rate. Reservoir models are recognized to be a flexible modeling tool allowing for modular structuring of its components. As such, an arbitrary differentiable function or an ML reservoir model may be used to model the fractional flow of oil in each producer.

Regarding production forecasting, the reservoir models described above are used to generate forecasts of oil and water production rates, given the injection rates for all water injectors. The forecasts take the influence of different injector wells and the delayed effects of previously injected water into account.

Figure 2:
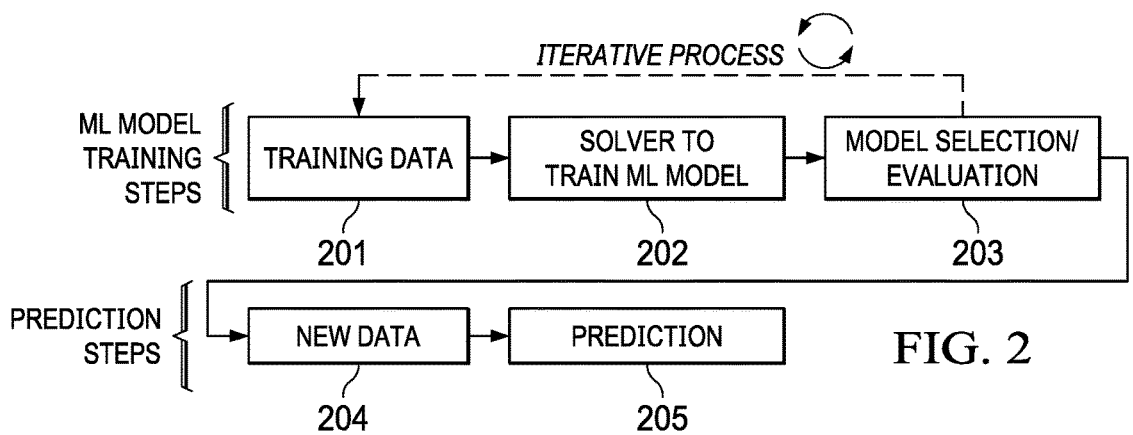
FIG. 2 depicts a series of steps for an example ML model training and inference process flow to train the reservoir model, tune the reservoir model, and deploy the trained reservoir model to provide predictions for the total production rate, according to an example aspect.

FIG. 2 depicts a series of steps for an example ML model training and inference process flow to train a reservoir model, tune the reservoir model, and deploy the trained reservoir model to provide predictions for the total production rate for the production well comprising at least one of the hydrocarbon production rate and the water production rate, according to an example aspect. These steps are applicable to all the above-mentioned ML, virtual metering, accuracy estimation, production back-allocation, injection well influence and production forecast. The purpose of the ML process is to train and deploy models for each sensor, well, or facility. During model development, a plurality of reservoir models may be trained and evaluated to determine the best performing models to deploy to the application. The steps are shown as steps 201-205 in FIG. 2, and are described below.

Training the ML reservoir model comprises steps 201-203. Step 201 comprises selecting training data generally comprising data for the water injection rate and the hydrocarbon production rates. Data scientists can select relevant training data for each reservoir model. The selected tags are used as input to train ML reservoir models that will be used for estimating a state of the system (virtual metering) or assessing injector/producer connections and production forecasts. Selecting relevant features requires a structured dataset that can provide the physical relationships between tags and parent subsystems or parent equipment.

Step 202 comprises training an ML reservoir model. After the training data is selected in Step 201, ML reservoir models are trained. The customer can prepare a plurality of different reservoir models so that the application is pre-configured with ML reservoir models that only need to be trained on customer's data. Step 203 comprises evaluating the performance of the trained reservoir models. After the reservoir model is trained in step 202, its predicted production rate(s) is generally evaluated versus historical production rate data.

In general, evaluating a model involves checking the quality of predictions based on periods of time where measurements for the predicted variables of interest are available. Evaluating a reservoir model generally means checking to see if at least the predicted hydrocarbon and water production rates are a good fit compared to the historical data.

As soon as a measurement becomes available it can be used as a part of the data set used for evaluating a model. In that sense, as soon as current data is digested in the system it can be used for evaluation of the model. The performance of the reservoir model is generally evaluated by comparing the reservoir model predictions with ground truth (actual measurement) data. This step ensures that the trained reservoir model is accurately identifying important relations of the system. By iteratively training and evaluating trained reservoir models, data scientists using disclosed aspects can customize the reservoir model for various parts of the system.

Figure 4:
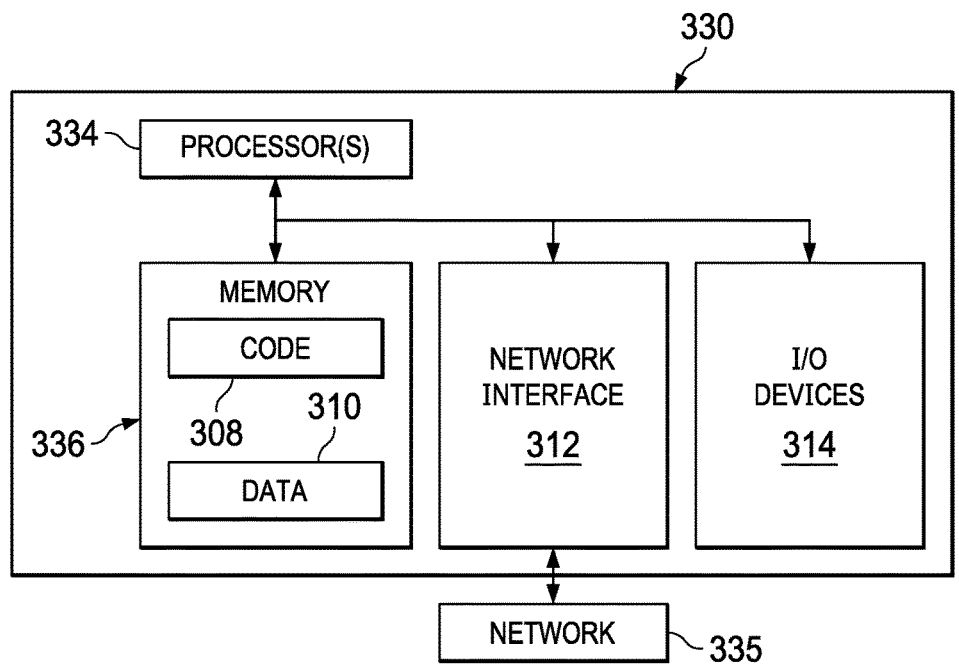
FIG. 4 is a block diagram representation for an example computing system that can be used to implement disclosed methods, according to an example aspect.

Steps 204 and 205 comprise prediction steps. The purpose of these prediction steps is to generate predictions based on new data received and to guide the end user to understand the predictions. Step 204 comprises inputting new data. Following steps 201-203, the trained ML reservoir model is ready to generate predictions. To do so, new data ingested into a computer system running disclosed algorithms is automatically inputted into the ML reservoir model for each subsystem. The new data should be ingested in the same format and frequency as the historical data used to train the ML reservoir model. The computer system running the disclosed algorithms can manage outliers and brief periods of missing data without end user intervention. FIG. 4 described below provides a block diagram representation for an example computing system 330 that can be used to implement disclosed methods.

Step 205 comprises generating a prediction. The ML reservoir models generate a prediction for each time interval of new data ingested into the application for all in-scope points of interest. The prediction output varies depending on each point of interest. During the ML model training steps (201-203) described above, the ML reservoir model is generally trained using data from many different operating conditions for the reservoir. The different conditions arise from the fact that throughout production from a field different control strategies and inputs have been utilized. Examples of specific control inputs include different configurations of injection and production wells including different water injection schedules and control sequences for bottom hole pressures. Therefore, the new trained reservoir model prediction is able to adapt to different operating states. This means that despite multiple changes in field operations, such as adjusting the water injection flow rate, the trained model will still generally provide accurate predictions.

Figure 3A:
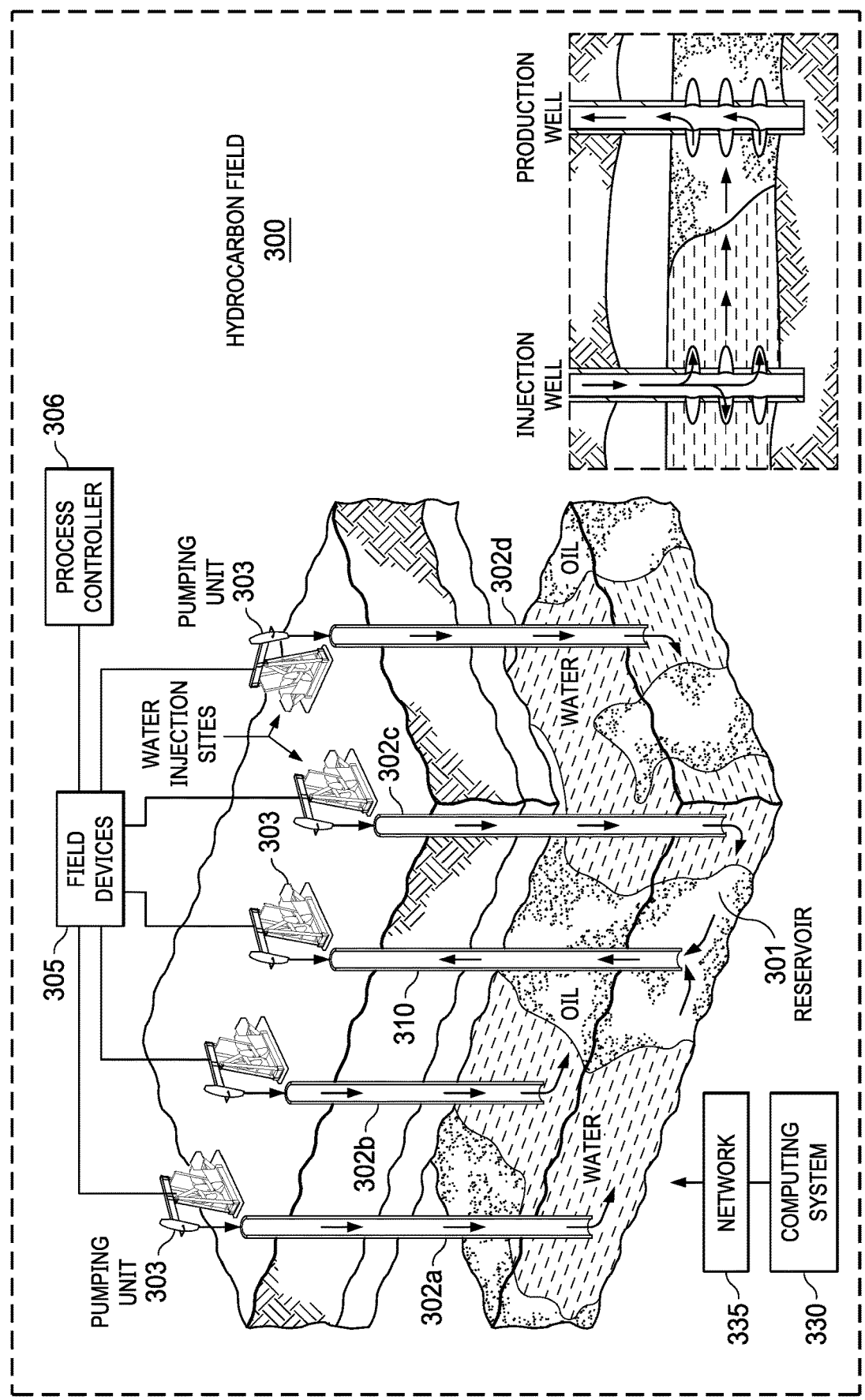
FIG. 3A depicts a hydrocarbon field including a reservoir having at least one production well having pumping units (also referred to as being "sucker rod pumps") for extracting the hydrocarbons within the reservoir, and a plurality of injection wells shown coupled to the production well having a disclosed computing system for implementing a disclosed method of waterflood management of a reservoir that includes a solver implementing automatic differentiation for solving a reservoir model relation for the reservoir coupled to communicate with some components of the hydrocarbon field by a network.

FIG. 3A depicts a hydrocarbon field 300 including a reservoir 301 having at least one production well 310 shown having pumping units 303 for extracting the hydrocarbons in the reservoir 301, and a plurality of injection wells shown by example including for injection wells shown by example including four injection wells 302a, 302b, 302c and 302d, shown coupled to the production well 310 having a disclosed computing system 330 coupled to communicate with some components of the hydrocarbon field 300 including the process controller 306 by a network 335. There can also be as little as two, three, or more than four injection wells. The computing system 330 can be located on-site or remotely located including in one aspect in the cloud.

The computing system 330 is for implementing a disclosed method of waterflood management of a reservoir that includes an iterative solver implementing automatic differentiation for solving a reservoir model numerical relation for the reservoir 301. As defined above, automatic differentiation refers to a set of techniques that algorithmically evaluate the derivative of a mathematical function specified by a computer program. Automatic differentiation is generally implemented by pre-compilers that analyze code written for evaluating a function of several variables, where the function to be solved in the case of a reservoir model generally comprises a non-linear partial differential equation.

These pre-compilers can automatically add instructions needed to compute the required derivatives by properly handling quantities that are common to the function and its derivatives and by efficient use of available derivatives in a library. The resulting expanded code can then be compiled with a standard compiler into an object code that can simultaneously evaluate derivatives and function values. The computing system 330 that implements disclosed methods is communicatively coupled to a process controller 306 that is shown coupled to field devices 305, comprising sensors for providing sensor data such as temperature and pressure and actuators, for implementing control of devices associated with the reservoir 301, such as the pumping units 303 shown.

Figure 3B:
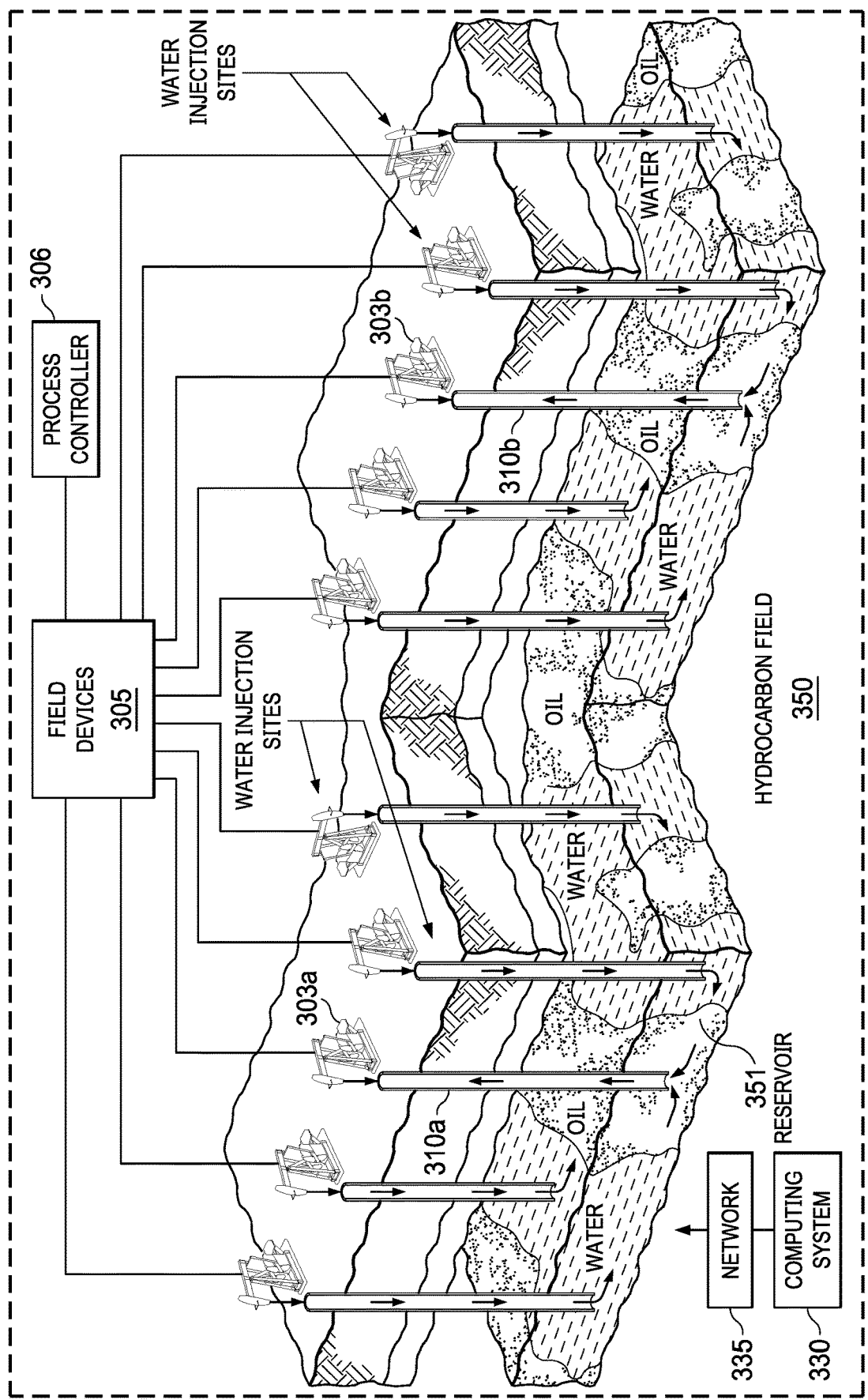
FIG. 3B depicts a hydrocarbon field including a reservoir having a plurality of production wells and a plurality of injection wells coupled to the respective production wells having a disclosed computing system for implementing a disclosed method of waterflood management of a reservoir that includes the solver implementing automatic differentiation for solving a reservoir model relation for the reservoir, according to an example aspect.

FIG. 3B depicts a hydrocarbon field 350 including a reservoir 351 having a plurality of production wells 310a and 310b and a plurality of injection wells coupled to the respective production wells having a disclosed computing system 330 for implementing a disclosed method of waterflood management of the reservoir 351. Several of the pumping units are identified as 303a, and 303b. The computing system 330 includes an iterative solver implementing automatic differentiation for solving a reservoir model for the reservoir 351.

FIG. 4 is a block diagram representation for an example computing system 330 that can implement disclosed methods, according to an example aspect. The computing system 330 may be located on-site or remote, including the cloud. The computing system 330 includes at least one processor 334, such as a microprocessor or digital signal processor, that is coupled to memory 336, a network interface 312, and input/output (I/O) devices 314. The computer system 330 may comprise a uniprocessor system including one processor 334, or a multiprocessor system including a plurality of processors 334. In general, processors 334 may be any suitable processor capable of executing instructions. For example, in various aspects, processors 334 may be general-purpose or embedded microprocessors implementing any of a variety of instruction set architectures (ISAs).

The memory 336 generally comprises a non-transitory, computer-readable storage medium configured to store program instructions of code 308 and historical data 310 accessible by the processor(s) 334, shown as memory 336. The memory 336 may comprise static random-access memory (SRAM), synchronous dynamic RAM (SDRAM), nonvolatile/flash-type memory, or generally any other type of memory. Code 308 and data 310 for implementing the functionality disclosed herein are stored within the memory 336. For example, the code 308 may include instructions that when executed by processor(s) 334 implement disclosed operations described above.

The network interface 312 may be configured to allow data to be exchanged between the computing system 330 and/or other devices coupled to the network 335, like those associated with the hydrocarbon fields shown in FIGS. 3A and 3B, including the process controllers 306. The network interface 312 may support communication via wired or wireless data networks, such as any suitable type of Ethernet network or wireless network.

In general, I/O devices 314 may include one or more display terminals, keyboards, keypads, touchpads, scanning devices, voice or optical recognition devices, or any other devices suitable for entering or retrieving data associated with the computing system 330. Multiple I/O devices 314 may be provided. Similar I/O devices may be separate from the computing system 330 that may interact with the computing system through a wired or wireless connection, such as over the network interface 312.

It is to be understood that computing system 330 is only an example and is thus not intended to limit the scope of any disclosed aspect. For example, the computing system 330 may include any combination of hardware or software that can perform the functions disclosed herein, including computers, network devices, internet appliances, PDAs, and wireless phones. The computing system 330 may also be connected to other devices that are not illustrated. In addition, the functionality provided by the illustrated components may be combined in fewer components or be distributed in additional components.

EXAMPLES

Disclosed aspects are further illustrated by the following specific examples, which should not be construed as limiting the scope or content of this Disclosure in any way.

Figure 5A:
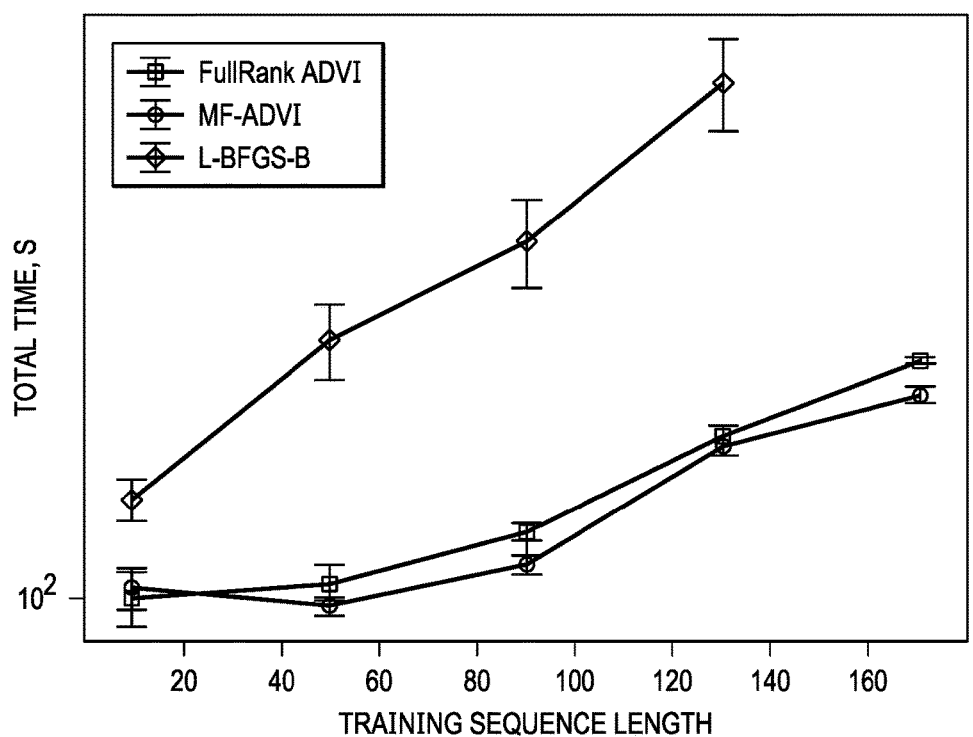
FIGS. 5A-C compare the time required to train reservoir models and quantify the uncertainty in their parameters by methods disclosed herein. The data in these FIGS. provides evidence regarding the scalability and efficacy of disclosed aspects.
Figure 5B:
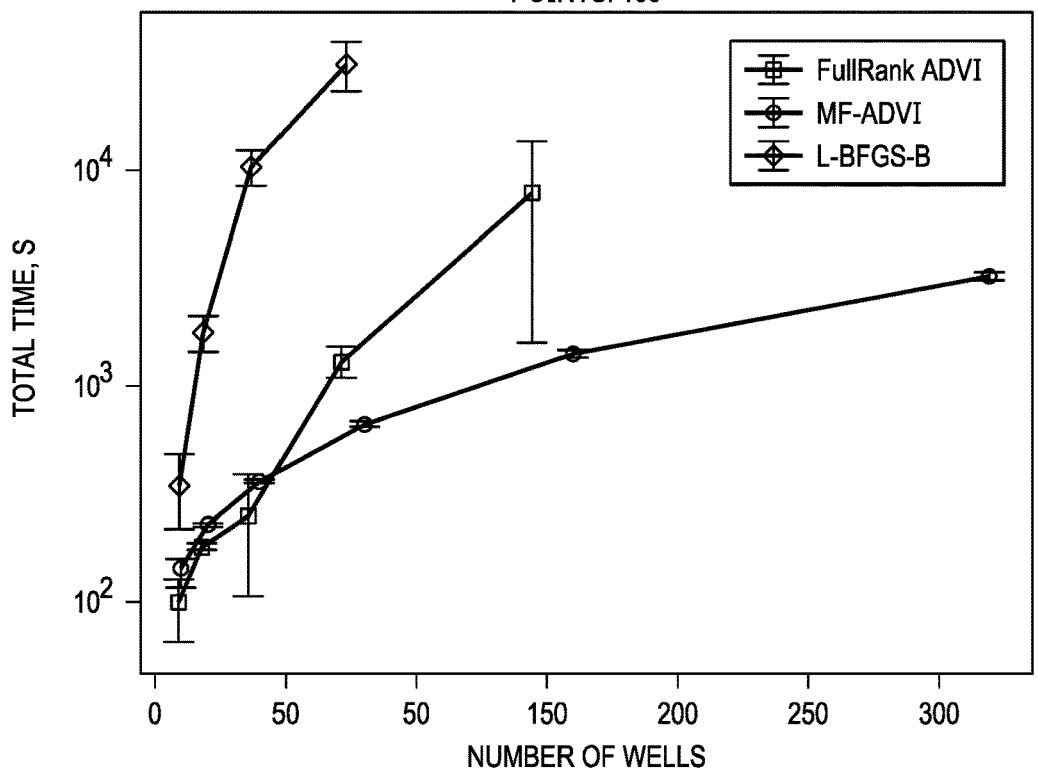
Figure 5C:
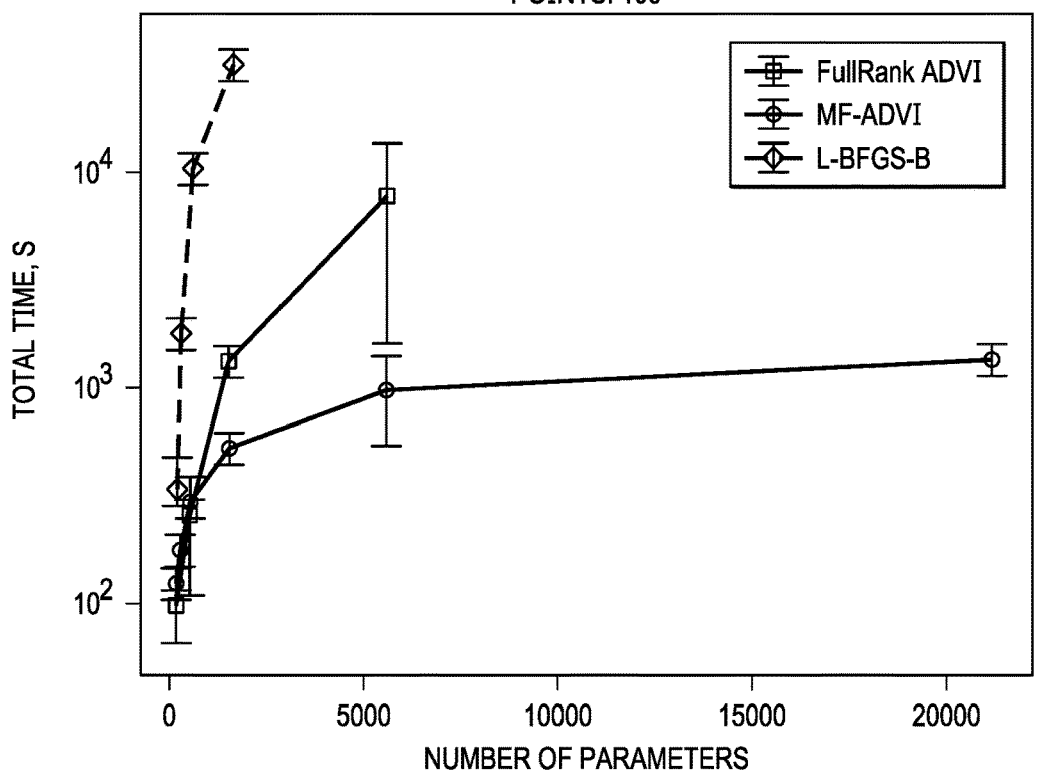

FIGS. 5A-C compare the time required to train reservoir models by the methods disclosed herein that evidences scalability and efficacy of disclosed aspects. Abbreviations used in these FIGS. regarding algorithms referenced are MF-ADVI for mean-field approximation, FR-ADVI for full-rank approximation, and the optimization for L-BFGS-B. L-BFGS-B represents an iterative optimization solver comprising a quasi-newton optimization algorithm which represents an example of a disclosed solver. Common parameters for this data utilized comprised 100 samples generated in each experiment, and the ADVI was trained using 50,000 iterations.

FIG. 5A is a plot of total time in seconds versus the number of data points shown as the training sequence length for nine (9) production wells. The method is shown scaling with increasing problem size, which is a significant advantage over conventional optimization algorithms. Shown specifically is training time as a function training sequence length with the number of wells staying fixed. FIG. 5B is a plot of the total time versus the number of production wells, where there were 100 data points. This data shows results from fixing the training sequence length, and explores the training time as a function of the problem size (or well count).

FIG. 5C is a plot of the total time versus the number of model parameters, where again there were 100 data points used. This data is similar to the data in FIG. 5B but the problem size is now expressed in terms of parameter count and not the well count, although it remains a 1-to-1 mapping. The significance of this data is further evidence for the method's scalability.

While various disclosed aspects have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of waterflood management for a reservoir having at least one hydrocarbon-containing production well and at least one injector well, the method comprising:
   obtaining a mathematical reservoir model for characterizing the reservoir, the reservoir model comprising model parameters relating a water injection rate of the at least one injector well to at least one production rate, the at least one production rate comprising a total production rate of the at least one production well, the total production rate including at least one of a hydrocarbon production rate or a water production rate;
   running a solver implementing automatic differentiation utilizing training data regarding the reservoir and constraints for the model parameters, the training data including operational data comprising at least one of recent sensor data or historical data for at least one of the hydrocarbon production rate or the water injection rate, the solver solving the reservoir model by converting a constrained reservoir model optimization problem into an approximate unconstrained problem and solving the approximate unconstrained problem to identify values or a distribution of values for the model parameters and generate a machine learning-based trained reservoir model; and
   generating one or more outputs including one or more predictions for the total production rate using the trained reservoir model by running the trained reservoir model using at least one water injection schedule for the at least one injector well in order to optimize hydrocarbon production from the reservoir.

2. The method of claim 1, wherein:
the solver comprises an iterative solver; and
the method further comprises:
obtaining updated training data, rerunning the solver to generate an updated trained reservoir model, and regenerating the one or more predictions using the updated trained reservoir model; and
selecting one of the trained reservoir model or the updated trained reservoir model based on at least one evaluation criterion for performance.

3. The method of claim 2, wherein:
the iterative solver comprises a Bayesian inference solver; and
the method further comprises adding test data regarding the reservoir to the training data utilized by the Bayesian inference solver.

4. The method of claim 3, wherein the Bayesian inference solver implements automatic differentiation variational inference or variational neural networks.

5. The method of claim 1, wherein:
the trained reservoir model further selects the at least one water injection schedule from a plurality of water injection schedules using one or more injection schedule considerations; and
the one or more injection schedule considerations comprise one or more of:
a total production value of the reservoir,
a total cost of produced water treatment;
a total cost of water injection; or
a target hydrocarbon production rate.

6. The method of claim 1, wherein the solver comprises a Quasi-Newton Nonlinear (QNN) solver that is configured to utilize an analytic gradient of the reservoir model.

7. The method of claim 1, wherein:
the model parameters separately relate the water injection rate to the hydrocarbon production rate and the water production rate; and
the trained reservoir model further provides (i) an uncertainty quantification for the hydrocarbon production rate and the water production rate and (ii) an uncertainty quantification for at least one of the model parameters.

8. The method of claim 1, further comprising:
providing the one or more outputs to one or more controllers associated with the reservoir, the one or more controllers configured to automatically monitor the recent sensor data and send alerts or control signals to control one or more devices that are configured to adjust one or more operating conditions for the reservoir.

9. The method of claim 1, wherein:
the total production rate includes the hydrocarbon production rate and the water production rate; and
the solver further outputs a loss function that quantifies a difference between (i) predictions for the hydrocarbon production rate and an actual hydrocarbon production rate and (ii) predictions for the water production rate and an actual water production rate.

10. The method of claim 1, wherein:
the reservoir has a plurality of injector wells; and
the reservoir model further models a coupling between each of the plurality of injector wells and the at least one production well.

11. The method of claim 10, wherein:
the reservoir has a plurality of production wells; and
the reservoir model further models a coupling between respective ones of the plurality of production wells and the injection wells.

12. The method of claim 10, wherein:
the model parameters separately relate the water injection rate to the hydrocarbon production rate and the water production rate; and
the one or more outputs further comprise (i) a derivative of a prediction for the hydrocarbon production rate with respect to the water injection rate for each of the plurality of injector wells and (ii) a derivative of a prediction for the water production rate with respect to the water injection rate for each of the plurality of injector wells.

13. The method of claim 1, wherein:
the reservoir model comprises a Bayesian reservoir model; and
the Bayesian reservoir model comprises probabilistic graphical modeling.

14. A system comprising:
at least one memory configured to store a mathematical reservoir model for characterizing a reservoir having at least one hydrocarbon-containing production well and at least one injector well, the reservoir model comprising model parameters relating a water injection rate of the at least one injector well to at least one production rate, the at least one production rate comprising a total production rate of the at least one production well, the total production rate including at least one of a hydrocarbon production rate or a water production rate; and
at least one processor configured to:
run a solver implementing automatic differentiation utilizing training data regarding the reservoir and constraints for the model parameters, the training data including operational data comprising at least one of recent sensor data or historical data for at least one of the hydrocarbon production rate or the water injection rate, the solver configured to solve the reservoir model by converting a constrained reservoir model optimization problem into an approximate unconstrained problem and solving the approximate unconstrained problem to identify values or a distribution of values for the model parameters and generate a machine learning-based trained reservoir model; and
generate one or more outputs including one or more predictions for the total production rate using the trained reservoir model by running the trained reservoir model using at least one water injection schedule for the at least one injector well in order to optimize hydrocarbon production from the reservoir.

15. The system of claim 14, wherein:
the solver comprises an iterative solver; and
the at least one processor is further configured to:
obtain updated training data, rerun the solver to generate an updated trained reservoir model, and regenerate the one or more predictions using the updated trained reservoir model; and
select one of the trained reservoir model or the updated trained reservoir model based on at least one evaluation criterion for performance.

16. The system of claim 14, wherein the solver comprises a Bayesian inference solver.

17. The system of claim 14, wherein:
the trained reservoir model is further configured to select the at least one water injection schedule from a plurality of water injection schedules using one or more injection schedule considerations; and the one or more injection schedule considerations comprise one or more of:
    a total production value of the reservoir;
    a total cost of produced water treatment;
    a total cost of water injection; or
    a target hydrocarbon production rate.

18. The system of claim 14, wherein:
the model parameters separately relate the water injection rate to the hydrocarbon production rate and the water production rate; and
the trained reservoir model is further configured to provide (i) an uncertainty quantification for the hydrocarbon production rate and the water production rate and (ii) an uncertainty quantification for at least one of the model parameters.

19. The system of claim 14, wherein:
the total production rate includes the hydrocarbon production rate and the water production rate; and
the solver is further configured to output a loss function that quantifies a difference between (i) predictions for the hydrocarbon production rate and an actual hydrocarbon production rate and (ii) predictions for the water production rate and an actual water production rate.

20. The system of claim 14, wherein:
the reservoir has a plurality of injector wells;
the reservoir has a plurality of production wells; and
the reservoir model further models a coupling between each of the plurality of injector wells and each of the production wells.

21. The system of claim 20, wherein:
the model parameters separately relate the water injection rate to the hydrocarbon production rate and the water production rate; and
the one or more outputs further comprise (i) a derivative of a prediction for the hydrocarbon production rate with respect to the water injection rate for each of the plurality of injector wells and (ii) a derivative of a prediction for the water production rate with respect to the water injection rate for each of the plurality of injector wells.

22. A non-transitory computer readable medium containing instructions that when executed cause at least one processor to:
obtain a mathematical reservoir model for characterizing a reservoir having at least one hydrocarbon-containing production well and at least one injector well, the reservoir model comprising model parameters relating a water injection rate of the at least one injector well to at least one production rate, the at least one production rate comprising a total production rate of the at least one production well, the total production rate including at least one of a hydrocarbon production rate or a water production rate;
run a solver implementing automatic differentiation utilizing training data regarding the reservoir and constraints for the model parameters, the training data including operational data comprising at least one of recent sensor data or historical data for at least one of the hydrocarbon production rate or the water injection rate, the solver configured to solve the reservoir model by converting a constrained reservoir model optimization problem into an approximate unconstrained problem and solving the approximate unconstrained problem to identify values or a distribution of values for the model parameters and generate a machine learning-based trained reservoir model; and
generate one or more outputs including one or more predictions for the total production rate using the trained reservoir model by running the trained reservoir model using at least one water injection schedule for the at least one injector well in order to optimize hydrocarbon production from the reservoir.

23. The non-transitory computer readable medium of claim 22, wherein:
the solver comprises an iterative solver; and
the medium further contains instructions that when executed cause the at least one processor to:
    obtain updated training data, rerun the solver to generate an updated trained reservoir model, and regenerate the one or more predictions using the updated trained reservoir model; and
    select one of the trained reservoir model or the updated trained reservoir model based on at least one evaluation criterion for performance.

24. The non-transitory computer readable medium of claim 22, wherein the solver comprises a Bayesian inference solver.

25. The non-transitory computer readable medium of claim 22, wherein:
the trained reservoir model is further configured to select the at least one water injection schedule from a plurality of water injection schedules using one or more injection schedule considerations; and
the one or more injection schedule considerations comprise one or more of:
    a total production value of the reservoir;
    a total cost of produced water treatment;
    a total cost of water injection; or
    a target hydrocarbon production rate.

26. The non-transitory computer readable medium of claim 22, wherein:
the model parameters separately relate the water injection rate to the hydrocarbon production rate and the water production rate; and
the trained reservoir model is further configured to provide (i) an uncertainty quantification for the hydrocarbon production rate and the water production rate and (ii) an uncertainty quantification for at least one of the model parameters.

27. The non-transitory computer readable medium of claim 22, wherein:
the total production rate includes the hydrocarbon production rate and the water production rate; and
the solver is further configured to output a loss function that quantifies a difference between (i) predictions for the hydrocarbon production rate and an actual hydrocarbon production rate and (ii) predictions for the water production rate and an actual water production rate.

28. The non-transitory computer readable medium of claim 22, wherein:
the reservoir has a plurality of injector wells;
the reservoir has a plurality of production wells; and
the reservoir model further models a coupling between each of the plurality of injector wells and each of the production wells.

29. The non-transitory computer readable medium of claim 28, wherein:
the model parameters separately relate the water injection rate to the hydrocarbon production rate and the water production rate; and the one or more outputs further comprise (i) a derivative of a prediction for the hydrocarbon production rate with respect to the water injection rate for each of the plurality of injector wells and (ii) a derivative of a prediction for the water production rate with respect to the water injection rate for each of the plurality of injector wells.

30. A method of waterflood management for a reservoir having at least one hydrocarbon-containing production well and at least one injector well, the method comprising:
  obtaining a mathematical reservoir model for characterizing the reservoir, the reservoir model comprising model parameters relating a water injection rate of the at least one injector well to a total production rate of the at least one production well, the total production rate including at least one of a hydrocarbon production rate or a water production rate;
  running a Bayesian inference solver implementing automatic differentiation utilizing training data regarding the reservoir and constraints for the model parameters, the training data including operational data comprising at least one of recent sensor data or historical data for at least one of the hydrocarbon production rate or the water injection rate, the solver solving the reservoir model by converting a constrained reservoir model optimization problem into an approximate unconstrained problem and solving the approximate unconstrained problem to identify values or a distribution of values for the model parameters and generate a machine learning-based trained reservoir model; and
  generating one or more outputs including one or more predictions for the total production rate using the trained reservoir model by running the trained reservoir model using at least one water injection schedule for the at least one injector well in order to optimize hydrocarbon production from the reservoir.

31. A method comprising:
  determining a predicted total production rate including a hydrocarbon production rate and a water production rate for a reservoir, wherein a machine learning-based trained data-driven reservoir model is generated based on automatic differentiation utilizing training data of the trained data-driven reservoir model to solve a non-linear partial differential equation, and wherein the training data includes historical production rate data and operational data;
  generating one or more operating conditions for the reservoir based on the trained data-driven reservoir model; and
  transmitting the one or more operating conditions to one or more control devices.

32. The method of claim 31, wherein the trained data-driven reservoir model is trained independent of geological modeling.

33. The method of claim 31, further comprising:
  using updated training data to generate an updated trained data-driven reservoir model; and
  selecting one of the trained data-driven reservoir model and the updated trained data-driven reservoir model based on at least one evaluation or performance criterion.

34. The method of claim 31, wherein:
  determining the predicted total production rate further comprises generating a plurality of different machine learning-based trained data-driven reservoir models; and
  generating one or more operating conditions further comprises iteratively evaluating a performance of the plurality of trained data-driven reservoir models based on updated training data.

35. The method of claim 34, wherein the plurality of different machine learning-based trained data-driven reservoir models comprise a variety of different solver types.

* * * * *